2,963,498
Patented Dec. 6, 1960

2,963,498

DEHYDRO DERIVATIVES OF 11-OXYGENATED 17α - (LOWER ALKANOYL) - OXY-9α-HALOPREGNANE-3,20-DIONES

Clarence G. Bergstrom, Chicago, and Robert T. Nicholson, Glenview, Ill., assignors to G. D. Searle & Co., Chicago, Ill., a corporation of Delaware No Drawing. Filed May 11, 1959, Ser. No. 812,112

7 Claims. (Cl. 260—397.45)

This invention relates to novel steroids which contain a dienoid or trienoid structure and more particularly to 11-oxygenated 17α-(lower alkanoyl)oxy-9α-halopregna-1,4-diene-3,20-diones, 11-oxygenated 17α-(lower alkanoyl)oxy-9α-halopregna-4,6-diene-3,20-diones, and 11-oxygenated 17α-(lower alkanoyl)oxy-9α-halopregna-1,4,6-triene-3,20-diones, represented by the structural formulae:

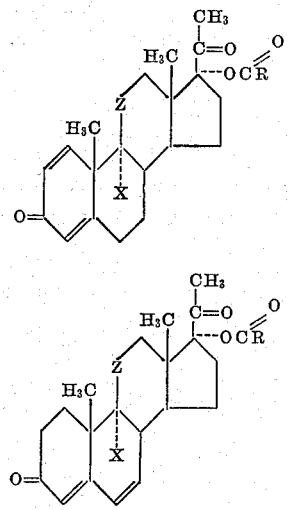

and

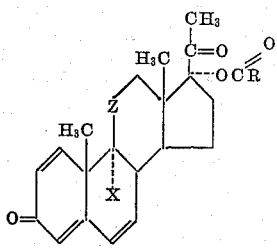

wherein X is a halogen atom having an atomic weight less than 100, Z is selected from the group consisting of carbonyl, β-hydroxymethylene, and β-(lower alkanoyl)-oxymethylene radicals, and R is a lower alkyl radical. The lower alkyl radicals represented by R are exemplified by methyl, ethyl, propyl, butyl, pentyl, hexyl, heptyl, octyl, and the branched-chain isomers thereof. The term lower alkanoyl is defined herein to include, for example, formyl, acetyl, propionyl, butyryl, valeryl, hexanoyl, heptanoyl, octanoyl, and the branched-chain isomers thereof, said groups being the acyl radicals of alkanoic acids containing less than 9 carbon atoms.

Suitable starting materials for the preparation of the 11-keto compounds of this invention are 9α-halo-17α-hydroxypregn-4-ene-3,11,20-triones. The latter compounds can be acylated as, for example, by treatment with a lower alkanoic acid anhydride in the presence of a suitable acid catalyst followed by reaction with a mineral acid, to yield the corresponding 17α-alkanoates. Reaction of the latter compounds with selenous acid results in preferential dehydrogenation of the carbon to carbon bond in the 1,2-position to afford the instant pregna-1,4-dienes. On the other hand, selective dehydrogenation of the carbon to carbon bond in the 6,7-position occurs upon treatment of the 17α-(lower alkanoyl)oxy-9α-halopregn-4-ene-3,11,20-triones with chloranil in a non-polar solvent such as xylene, to yield the 4,6-pregnadienes of this invention. When an excess of chloranil an n-amyl alcohol are utilized, however, in the reaction with the aforementioned 17α-(lower alkanoyl)oxy-9α-halopregn-4-ene-3,11,20-triones, the instant pregna-1,4,6-trienes are obtained. As specific examples of the processes described above, 9α-fluoro-17α-hydroxypregn-4-ene-3,11,20-trione is reacted first with acetic anhydride in the presence of p-toluenesulfonic acid then with hydrochloric acid in methanol to afford 17α-acetoxy-9α-fluoropregn-4-ene-3,11,20-trione. Reaction of the latter substance: (1) with selenous acid affords 17α-acetoxy-9α-fluoropregna-1,4-diene-3,11,20-trione, (2) with chloranil in xylene yields 17α-acetoxy-9α-fluoropregna-4,6-diene-3,11,20-trione, and (3) with excess chloranil in n-amyl alcohol results in 17α-acetoxy-9α-fluoropregna-1,4,6-triene-3,11,20-trione.

Suitable starting materials for the 11β-hydroxy and 11β-(lower alkanoyl)oxy compounds of this invention are 9α-halo-11β,17α-dihydroxypregn-4-ene-3,20-diones. They may be either partially or completely acylated to afford the intermediate 17α-lower alkanoates and the 11β,17α-di-(lower alkanoates), respectively. Each of the latter groups of compounds can be dehydrogenated by the procedures outlined supra to afford the corresponding pregna-1,4-dienes, pregna-4,6-dienes, and pregna-1,4,6-trienes.

The compounds of this invention are useful as a result of their valuable pharmacological properties. They are, for example, diuretic agents in consequence of their ability to increase the excretion of water and sodium. They are also progestational agents.

The 6α-methyl analogs of the compounds disclosed supra are contemplated also by the present invention in consequence of their diuretic and progestational properties. These analogs can be manufactured by processes completely analogous to those utilized for the corresponding 6-desmethyl compounds.

The invention will appear more fully from the examples which follow. These examples are set forth by way of illustration only and it will be understood that the invention is not to be construed as limited in spirit or in scope by the details contained therein, as many modifications in materials and methods will be apparent in this disclosure to those skilled in the art. In these examples temperatures are given in degrees Centigrade (° C.). Quantities of materials are expressed in parts by weight unless otherwise noted.

*Example 1*

A mixture of 0.62 part of 9α-fluoro-17α-hydroxypregn-4-ene-3,11,20-trione and 26 parts of acetic acid is stirred for 10 minutes while a brisk stream of nitrogen is bubbled through the solution. Then 0.2 part of p-toluenesulfonic acid monohydrate is added in one portion followed by 2.7 parts of acetic anhydride. The mixture is stirred in a closed vessel in a nitrogen atmosphere for 12 hours and the resulting solution is poured slowly into 500 parts of stirred ice water. Stirring is continued for an hour after which the white solid is collected on a filter and washed with water. The crude enol acetate thus obtained melts in the range of 95–131°.

The solution of 0.56 part of this crude enol acetate in 20 parts of warm methanol is saturated with nitrogen and then treated with 0.3 part of concentrated hydrochloric acid. After standing for 2 hours the solution is diluted with 20 parts of water and chilled. The crystalline product is collected on a filter and recrystallized first from a mixture of acetone and petroleum ether then from methanol to yield 9α-fluoro-17α-acetoxypregn-4-ene-3,11,20-trione, melting at about 255–257°; $[\alpha]_D = +112°$.

By substituting an equivalent quantity of 9α-bromo-17α-hydroxypregn-4-ene-3,11,20-trione or 9α-chloro-17α-hydroxypregn-4-ene-3,11,20-trione and otherwise proceeding according to the processes described herein, 17α-acetoxy-9α-bromopregn-4-ene-3,11,20-trione, M.P. 183–188°, and 17α-acetoxy-9α-chloropregn-4-ene-3,11,20-trione are obtained. The latter chloro-ester exhibits infrared maxima at 5.75, 5.86, 6.03, 6.18, and 8.06 microns.

*Example 2*

By substituting equivalent quantities of n-butyric acid, n-butyric anhydride, and 9α-bromo-17α-hdroxypregn-4-ene-3,11,20-trione and otherwise proceeding according to the processes described in Example 1; 17α-n-butyroxy-9α-bromopregn-4-ene-3,11,20-trione is obtained. This substance displays maxima in the infrared at 5.76, 5.97, 6.22 and 8.52 microns.

The corresponding 9α-bromo and 9α-chloro n-butyrates are obtained by treating 9α-bromo-17α-hydroxypregn-4-ene-3,11,20-trione and 9α-chloro-17α-hydroxypregn-4-ene-3,11,20-trione according to the process described in this example.

*Example 3*

A mixture of one part of 9α-fluoro-11β,17α-dihydroxypregn-4-ene-3,20-dione, 0.40 part of p-toluene-sulfonic acid monohydrate and 11 parts of acetic anhydride in 105 parts of acetic acid is stirred under nitrogen at room temperature for 20 hours, cooled and treated with 40 parts of water. After 4 hours storage at 0° C., the aqueous milky mixture is extracted with ethyl acetate. This extract is washed successively with water, saturated sodium bicarbonate solution and again with water, dried over anhydrous calcium sulfate, filtered and taken to dryness at reduced pressure. The resulting gummy residue is dissolved in 40 parts of methanol and 0.4 part of concentrated aqueous hydrochloric acid is added in a nitrogen atmosphere. After 2 hours at room temperature, water is added and the crude product is applied to a chromatography column packed with silica gel. The column is developed with benzene solutions containing increasing concentrations of ethyl acetate. Elution with a solution of 15% ethyl acetate in benzene and crystallization of the residue first from a mixture of benzene and petroleum ether and then from acetone and petroleum ether yields 9α-fluoro-11β,17α-diacetoxypregn-4-ene-3,20-dione, melting at 277–282°.

Further elution of the column with 15–25% ethyl acetate in benzene and successive recrystallization of the residue from a mixture of benzene and petroleum ether and then from a mixture of ethyl acetate and petroleum ether yields 17α-acetoxy-9α-fluoro-11β-hydroxypregn-4-ene-3,20-dione, melting at about 266–269°.

By substituting an equivalent quantity of 9α-bromo-11β,17α-dihydroxypregn-4-ene-3,20-dione or 9α-chloro-11β,17α-dihydroxypregn-4-ene-3,20-dione and otherwise proceeding according to the herein described processes, the 9α-bromo-17α-monoacetate, M.P. 133–138° (dec.); the 9α-bromo-diacetate; the 9α-chloro-17α-monoacetate; and the 9α-chloro-diacetate are obtained.

*Example 4*

By substituting isovaleric acid and isovaleric anhydride in the process described in Example 3, 9α-fluoro-11β,17α-diisovaleryloxypregn-4-ene-3,20-dione and 9α-fluoro-11β-hydroxy-17α-isovaleryloxypregn-4-ene-3,20-dione are obtained. Infrared maxima for these two esters are observed at 5.76, 6.01, 6.23, and 8.47; and 2.9, 5.76, 6.01, 6.23, and 8.47 microns, respectively.

*Example 5*

To a solution of 10 parts of 17α-acetoxy-9α-fluoropregn-4-ene-3,11,20-trione in 800 parts of tertiary butyl alcohol containing 10 parts of acetic acid is added 4.7 parts of selenous acid and the mixture heated at reflux with stirring for about 24 hours. A second portion of 4.7 parts of selenous acid is added, then stirring and refluxing continued for about 24 hours longer. The reaction mixture is cooled and diluted with ethyl acetate and the resulting solution washed successively with aqueous sodium bicarbonate and water, dried over anhydrous sodium sulfate, and evaporated to dryness in vacuo. Adsorption of the residue on silica gel followed by elution with 10% ethyl acetate in benzene and recrystallization from acetone-hexane affords pure 17α-acetoxy-9α-fluoropregna-1,4-diene-3,11,20-trione, M.P. 235–238°.

By substituting an equivalent quantity of 17α-n-butyroxy-9α-bromopregn-4-ene-3,11,20-trione or 17α-acetoxy-9α-chloropregn-4-ene-3,11,20-trione; 17α-n-butyroxy-9α-bromopregna-1,4-diene-3,11,20-trione and 17α-acetoxy-9α-chloropregna-1,4-diene-3,11,20-trione are obtained. The latter two compounds exhibit maxima in the infrared at 5.74, 5.98, 6.13, 6.21, and 7.97; and 5.74, 5.98, 6.13, 6.21, and 8.44 microns, respectively.

*Example 6*

A mixture of 10 parts of 17α-acetoxy-9α-fluoropregn-4-ene-3,11,20-trione, 10 parts of chloranil, 0.20 part of p-toluenesulfonic acid, and 870 parts of xylene is heated at reflux for about 3 hours. The reaction mixture is cooled; washed successively with aqueous sodium sulfite, water, saturated aqueous sodium chloride, and water; dried over anhydrous sodium sulfate; and concentrated to dryness at reduced pressure. The residue is adsorbed on silica gel and eluted with 10% ethyl acetate in benzene. The precipitate obtained by concentration of the eluate to dryness in vacuo is adsorbed on silica gel and eluted successively with 5% ethyl acetate in benzene and 10% ethyl acetate in benzene. The two eluates are combined and evaporated to dryness in vacuo to yield the product, which can be recrystallized from acetone-hexane resulting in pure 17α-acetoxy-9α-fluoropregna-4,6-diene-3,11,20-trione, M.P. 236–237°.

By substituting an equivalent quantity of 17α-n-butyroxy-9α-bromopregn-4-ene-3,11,20-trione or 17α-acetoxy-9α-chloropregn-4-ene-3,11,20-trione and otherwise proceeding according to the herein described processes, 17α-n-butyroxy-9α-bromopregna-4,6-diene-3,11,20-trione and 17α-acetoxy-9α-chloropregna-4,6-diene-3,11,20-trione are obtained. These 4,6-dienes possess infrared maxima at 5.76, 6.02, 6.15, 6.27, and 8.42; and 5.76, 6.03, 6.17, 6.26, and 7.96 microns, respectively.

*Example 7*

A mixture of 10 parts of 17α-acetoxy-9α-fluoropregn-4-ene-3,11,20-trione, 20 parts of chloranil, 0.20 part of p-toluenesulfonic acid, and 800 parts of n-amyl alcohol is heated at reflux for 6 hours.

The reaction mixture is worked up according to the procedure described in Example 6 to afford 17α-acetoxy-9α-fluoropregna-1,4,6-triene-3,11,20-trione which exhibits maxima in the infrared at 5.79, 6.07, 6.25, and 8.01 microns.

By substituting an equivalent quantity of 17α-n-butyroxy-9α-bromopregn-4-ene-3,11,20-trione or 17α-acetoxy-9α-chloropregn-4-ene-3,11,20-trione; 17α-n-butyroxy-9α-bromopregna-1,4,6-triene-3,11,20-trione and 17α-acetoxy-9α-chloropregna-1,4,6-triene-3,11,20-trione are obtained. The infrared spectra of the latter 1,4,6-trienes display maxima at 5.79, 6.08, 6.26, and 8.49; and 5.78, 6.06, 6.25, and 8.01 microns, respectively.

Example 8

By substituting an equivalent quantity of 17α-acetoxy-9α-fluoro-11β-hydroxypregn-4-ene-3,20-dione or 9α-fluoro-11β-hydroxy-17α-isovaleryloxypregn-4-ene-3,20 - dione in the process described in Example 5, 17α-acetoxy-9α-fluoro-11β-hydroxypregna-1,4-diene-3,20-dione and 9α-fluoro-11β-hydroxy-17α-isovaleryloxypregna - 1,4 - diene-3,20-dione are obtained. The former 1,4-diene displays maxima in the infrared at 2.80, 5.75, 5.93, 6.00, 6.14, 6.22, and 7.95 microns while the infrared spectrum of the latter 1,4-diene contains maxima at 2.80, 5.75, 5.93, 6.00, 6.14, 6.22, and 8.47 microns.

Example 9

By substituting an equivalent quantity of 11β,17α-diacetoxy-9α-fluoropregn-4-ene-3,20-dione or 9α-fluoro-11β,17α-diisovaleryloxypregn-4-ene-3,20-dione, and otherwise proceeding according to the process described in Example 6, 11β,17α-diacetoxy-9α-fluoropregna-4,6-diene-3,20-dione and 9α-fluoro-11β,17α-diisovaleryloxy-pregna-4,6-diene-3,20-dione are obtained. The diacetoxy-4,6-diene exhibits maxima in the infrared at 5.77, 5.98, 6.15, 6.28, and 8.00 microns while the infrared spectrum of the diisovaleryloxy-4,6-diene possesses maxima at 5.77, 5.98, 6.15, 6.28, and 8.47 microns.

Example 10

By substituting an equivalent quantity of 17α-acetoxy-9α-bromo-11β-hydroxypregn-4-ene-3,20-dione or 9α-fluoro-11β-hydroxy-17α-isovaleryloxypregn-4-ene-3,20 - dione dione in the procedure of Example 7, 17α-acetoxy-9α-bromo-11β-hydroxypregna-1,4,6-triene - 3,20 - dione, for which infrared maxima are observed at 2.88, 5.79, 6.07, 6.26, and 8.01 microns; and 9α-fluoro-11β-hydroxy-17α-isovaleryloxy-pregna-1,4,6-triene-3,20-dione, which exhibits infrared maxima at 2.88, 5.79, 6.07, 6.26, and 8.45 microns, are obtained.

What is claimed is:

1. A member selected from the group consisting of compounds represented by the structural formulae

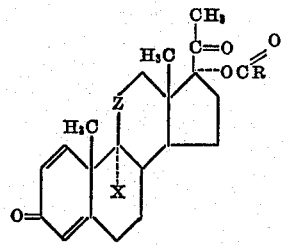

and

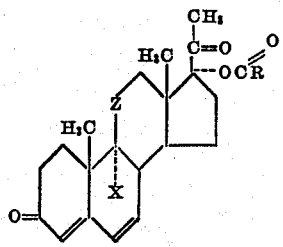

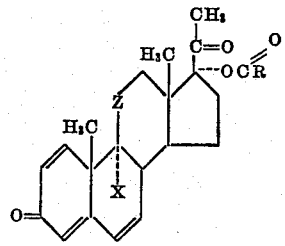

wherein X is a halogen atom having an atomic weight less than 100, Z is selected from the group consisting of carbonyl, β-hydroxymethylene, and β-(lower alkanoyl) oxymethylene radicals, and R is a lower alkyl radical.

2. A compound of the structural formula

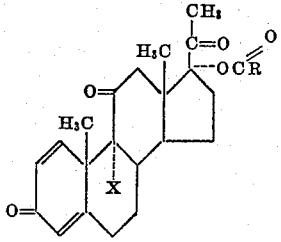

wherein X is a halogen atom having an atomic weight less than 100 and R is a lower alkyl radical.

3. A compound of the structural formula

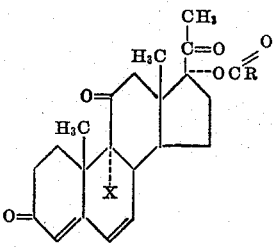

wherein X is a halogen atom having an atomic weight less than 100, and R is a lower alkyl radical.

4. 17α - acetoxy - 9α - fluoropregna - 1,4 - diene - 3,1, 20-trione.

5. 17α - acetoxy - 9α - fluoropregna - 4,6 - diene - 3,11, 20-trione.

6. 17α - acetoxy - 9α - fluoropregna - 1,4,6 - triene - 3, 11,20-trione.

7. 17α - acetoxy - 9α - fluoro - 11β - hydroxypregna-1,4-diene-3,20-dione.

References Cited in the file of this patent
UNITED STATES PATENTS

| | | |
|---|---|---|
| 2,819,264 | Gould et al. | Jan. 7, 1958 |
| 2,837,464 | Nobile | June 3, 1958 |
| 2,854,383 | Herzog | Sept. 30, 1958 |
| 2,892,851 | Bergstrom et al. | June 30, 1959 |